United States Patent Office 3,442,502
Patented May 6, 1969

---

3,442,502
AIR SPRING SUSPENSION FOR VEHICLES
Alvin M. Fischer and Harry J. Warmkessel, Allentown, Pa., assignors to Mack Trucks Inc., Montvale, N.J., a corporation of New York
Filed June 4, 1965, Ser. No. 461,394
Int. Cl. B60g 11/26
U.S. Cl. 267—65        2 Claims

ABSTRACT OF THE DISCLOSURE

A regulating system for a vehicle having an air spring, an air reservoir and a leveling valve through which the air spring is supplied by the air reservoir, including a dump valve connected between the leveling valve and the air spring which may be actuated to connect the air spring with, or to disconnect it from, the leveling valve, the dump valve having a mechanism responsive to air pressure in the air spring for venting the air spring and maintaining a predetermined low pressure therein when the air spring is disconnected from the leveling valve.

---

Figures 1, 2:
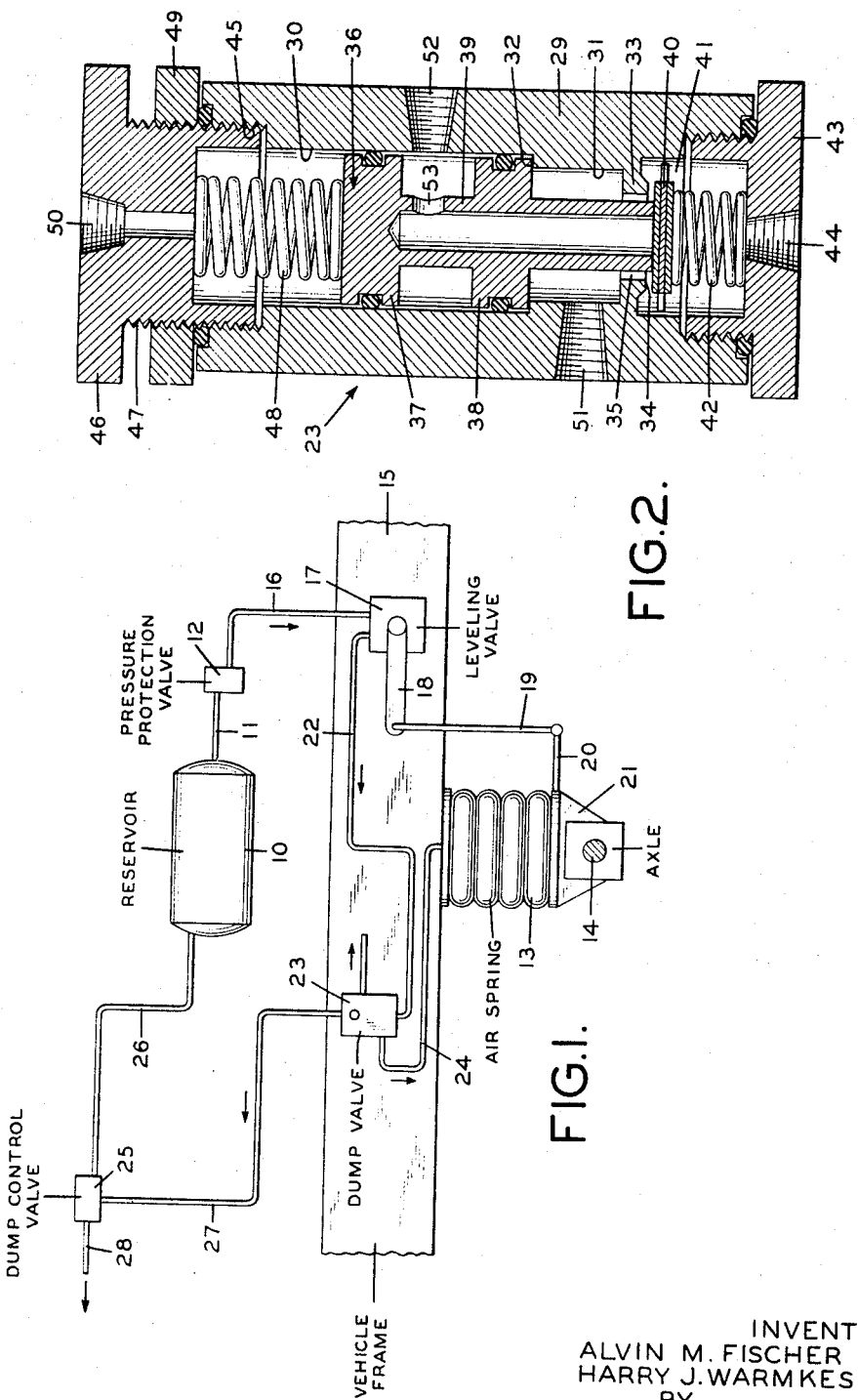

This invention relates to vehicle suspensions and particularly to a system for regulating and maintaining pressure in the air spring of an air or air and leaf spring suspension.

Air bags or bellows-type air springs are commonly used alone or in combination with leaf-springs in trailer trucks and other vehicles. Ordinarily, the air bags are pressurized by compression from an air reservoir supplied by an engine-driven compressor through a pressure protection valve and a leveling valve which adjusts the pressure in the air bags in response to prolonged load changes and body developments thereby maintains uniform spacing between axle and body or frame of the vehicle.

Inasmuch as leveling valves used in pressurizing and maintaining proper spacing between the axle and the vehicle frame or body are not responsive to momentary changes in spacing caused by road irregularities and the like, under some conditions of operation they can cause damage to shock absorbers and the vehicle and to the air spring themselves. Thus when a vehicle such as a tractor is operating alone, that is, without a load, and is of the type including leaf springs as well as the air springs, the leveling valve may vent all of the air from the air springs which will render them susceptible to collapsing, pivoting and extreme flexing due to road irregularities and the like. Also, when a tractor is being uncoupled from a trailer, the landing wheels or front jacks of the trailer are normally lowered while air pressure is maintained in the air bags or air springs of the tractor. When the tractor is pulled out from under the trailer or semi-trailer, the pressure in the air springs tends to kick or lift the back of the tractor suddenly and violently, sometimes damaging the shock absorbers or even the front of the trailer or the back of the tractor or the air springs.

In accordance with the present invention, an air spring system is provided in which the pressure in the air springs can be unloaded or reduced quickly by the operator of the vehicle before uncoupling and withdrawing the tractor from beneath the trailer.

More particularly, in accordance with the present invention, an operator-controlled dump and pressure regulating valve is interposed between the leveling valve and the air spring or springs to enable the vehicle driver or operator to reduce quickly the pressure in the air springs to a minimum pressure sufficient to avoid damage to the air bags but nevertheless insufficient to cause uncontrolled springing up of the back of the tractor as it is relieved of load. Maintenance of a low predetermined pressure in the air bags when the vehicle is operating without load improves the ride and handling characteristics of the vehicle in addition to protecting the air bags against damage.

For a better understanding of the present invention, reference may be had to the accompanying drawings, in which:

FIGURE 1 is a schematic diagrammatic view showing a typical air spring suspension system embodying the present invention; and FIGURE 2 is a view in vertical section through the dump and pressure regulating valve included in the new system.

As indicated above, the air spring suspension which is described hereinafter is preferably used in combination with a leaf spring suspension in heavy duty vehicles which are required to carry and haul heavy loads, such as tractors for trailers and semi-trailers. The leaf springs are not illustrated in FIGURE 1, inasmuch as they are conventional.

In the embodiment of the invention shown in FIGURE 1, the system includes a compressed air storage tank or reservoir 10 to which air is supplied by means of a compressor, not shown, which may be driven by the engine of the vehicle. Air is supplied from the reservoir 10 by means of a pipe 11 to a pressure protection valve 12 which maintains a safe predetermined air pressure in reservoir 10 for use by the brake system. Air from the pressure protection valve is supplied by means of a pipe 16 to a conventional leveling valve 17 of the delayed action type on the frame 15. The valve 17 is responsive only to prolonged changes in displacement of the frame 15 relative to the axle due to changing loads on the frame. The lever 18 is connected by means of a link 19 to an arm 20 which is attached to the axle or to a spring bolster 21 in any desired way. The discharge pipe 22 from the outlet of the leveling valve 17 is connected to a control and dump valve 23 which, as described hereinafter, controls the supply of air to, or discharge of air from, the air spring 13 through a pipe 24. Control of the dump valve 23 by the operator is achieved by means of a valve 25 in the cab of the vehicle which receives air under pressure from the reservoir 10 or other pressure source through a pipe 26. The valve 25 may also have another function in the system such as serving as a tractor protection control valve used for shutting off the air supplied to the trailer brake hoses prior to disconnecting the hoses from the tractor. In one position of the valve 25, air is vented from the dump valve 23 through a pipe 27 and a vent port. In another operating position of the valve 25, air is supplied under pressure from the reservoir 10 to the dump valve 23 through the pipe 27. The dump valve 23 which is a novel feature of the invention is disclosed more particularly in FIGURE 2. It includes a valve casing 29 having a cylindrical bore 30 therein communicating with a bore 31 in the lower end thereof of lesser diameter providing a shoulder 32 at the junction of the bores. Below the bore 31 is a partition 33 having a valve seat 34 on its lower surface and a central valve port 35 therethrough. Disposed within and reciprocally lengthwise of the enlarged bore 30 is a double headed piston valve plug 36 having an upper piston 37, a lower piston 38, and a tubular stem 39 connecting them and extending downwardly below the lower piston 38. In the lowermost position of the plug 36 the stem 39 extends through the apertaure and displaces from the contact with the seat 34 a valve disk 40 which is disposed in a chamber 41 below the partition 33 and is normally biased against the seat by means of a coil spring 42. The lower end of the chamber 41 is closed by means of a threaded cap 43 which supports the lower end of the spring 42 and has a port 44 therein with which the pipe 22 from the leveling valve is connected. The upper end of the casing 23 includes an internally threaded portion 45 for receiving an adjusting member 46 having an externally threaded sleeve 47 thereon enabling it to be adjusted inwardly and outwardly to vary the extent of compression of a coil spring 48 which bears against the underside of the adjusting member and against the upper end of the piston 36. A lock nut 49 may be provided on the threaded sleeve 47 to lock the adjusting member 46 in a desired position. Suitable O-ring seals may be provided in the valve at appropriate points for preventing leakage and also maintaining sealing engagement between the pistons 37 and 38 and the wall of the bore 30. An inlet port 50 is provided in the adjusting member 46 and is connected with the pipe 27 running from the dump control valve 25. Between the partition 33 and the shoulder 32 in the valve is a port 51 to which the pipe 24 leading to the air spring 13 is connected. A discharge port 52 is formed in the casing 29 between the pistons 37 and 38 of the piston valve plug 36 and communicates with the port 53 in the tubular stem 39.

The position of the valve plug 36 is responsive to the pressure supplied from the dump control valve 25, the pressure of the springs 42 and 48 and the pressure in the air spring 13 at the port 51. Accordingly, when the dump control valve is adjusted to supply air under sufficient pressure through the pipe 27 against the top of the piston 36, this pressure, in combination with the pressure exerted by the spring 48, moves the valve 36 downwardly seating the lower piston 38 against the shoulder 32 and displacing the disk valve 40 from its seat 34. At the same time, the disk valve seals the lower end of the tubular stem 39. With the valve in this condition and as shown in FIGURE 2, the pressure in the air spring is directly responsive to the action of the leveling valve 17 which will admit pressure to the air spring or discharge air from the air spring, depending upon the load carried by the vehicle, to maintain a predetermined spacing between the frame and the axle, while nevertheless permitting momentary changes in the spacing due to road irregularities and the like.

If, for any reason, it is desired to relieve the air spring of the pressure supplied by the leveling valve as, for example, when a trailer is to be uncoupled from the vehicle, the driver can actuate the dump control valve 25 to discharge the pressure above the plug 36 through the pipe 27 and the vent 28 in the dump control valve 25. Accordingly, the only pressure holding the valve plug 36 in its lower position is that of the spring 48 and a lower pressure which may be maintained by the valve 25. Any desired pressure, such as five pounds per square inch air pressure may be applied to the top of the plug 36. The higher pressure in the air spring 13 acting through the pipe 24 and the port 51 against the lower face of the lower piston 38 will displace the valve plug 36 upwardly allowing the disk valve 40 to engage its seat and uncovering the lower open end of the tubular valve stem 39 so that air in the air spring is vented through the vent port 52. When the pressure in the air spring decreases sufficiently, the spring 48 and any maintained air pressure above the plug 36 will force the plug 36 downwardly to close the lower end of the tubular valve stem without, however, displacing the valve disk 40 from its seat so that escape of additional air from the air spring is prevented. By adjusting the pressure applied by the spring 48 to the upper end of the piston 36, a predetermined pressure can be maintained in the spring 13. If because of leakage or any other reason the air pressure in the air spring 13 decreases still further, the spring 48 and the air pressure above the plug 36 will force the plug 36 downwardly, unseating the valve 40 from its seat 34 and allowing air to be admitted from the leveling valve through the port 44, the opening 35 and the port 51 into the air spring to again establish a balance between the pressure exerted on the top of the piston 37 and the bottom of the piston 38. Inasmuch as the valve 23 can be actuated almost instantaneously to discharge pressure down to a predetermined value in the air spring, all that the operator needs to do before uncoupling a trailer from a tractor is to actuate the dump control valve 25 to partially deflate the air springs, after which the tractor can be withdrawn without springing up as it is relieved of the load of the trailer. By the same token, by leaving the dump control valve in its venting position, a sufficient air pressure is maintained in the air spring 13 to prevent damage to the air spring while the vehicle is operated in an unloaded condition and with the major portion of the vehicle load carried by the leaf spring suspension.

It will be understood that a single dump valve and the leveling valve can be provided for both air springs at opposite ends of the axle or that separate leveling valves and dump valves may be provided for each of the air springs of the vehicle. Also, other interconnections are possible in order to stabilize and prevent tilting of the vehicle in accordance with known practice. Accordingly, inasmuch as the above described system is susceptible to considerable modification in its detail and arrangement, the embodiment of the invention disclosed herein should be considered as illustrative and not as limiting the scope of the following claims.

We claim:

1. In an air spring system for vehicles having at least one inflatable air spring, a source of air pressure and at least one leveling valve interposed between said air spring and said source for admitting air into and discharging air from said air spring, the combination therewith of dump valve means interposed between said leveling valve and said air spring and having one actuated position connecting said leveling valve to said air spring for flow of air between said air spring and said leveling valve, and another actuated position disconnecting said air spring from said leveling valve to prevent flow of air between said leveling valve and said air spring, means in said dump valve means in said another actuated position responsive to air pressure in said air spring for venting air from said air spring to reduce the air pressure therein and maintain a predetermined low pressure in said air spring, and means for actuating said dump valve means selectively to said one and said another actuated positions.

2. A dump control and pressure regulating system for a vehicle having an air reservoir comprising: an air spring; a leveling valve through which the air spring is supplied by the air reservoir; a dump valve connected in series between the leveling valve and the air spring; the dump valve having a valve body defining a chamber and a series of ports including a pressure inlet port at the bottom of the valve body connected to the leveling valve, a pressure outlet port in the side of the valve body connected to the air spring, a control port at the top of the valve body, and an exhaust port in the side of the body between the outlet and control ports; a dump control valve connected in series between the reservoir and the control port of the dump valve and having means for regulating the flow of air from the reservoir to the dump valve and means for exhausting air from the dump valve; the dump valve further having an inlet valve in the lower portion of the chamber between the inlet and outlet ports including a valve seat and a valve disk biased toward the seat to close the portion of the chamber between the inlet and outlet ports; and the dump valve having a piston reciprocally disposed in the chamber adjacent to the exhaust port between the outlet and control ports and having a hollow stem extending from the bottom of the piston toward the inlet valve and leading into a passage through the piston and out the side thereof adjacent to the exhaust port, the stem engaging the valve disk to close the exhaust passage and open the inlet valve when the piston is in the lower portion of the chamber and disengaging the disk to close the inlet valve and open the exhaust passage when the piston is in the upper portion of the chamber.

References Cited

UNITED STATES PATENTS

| | | | |
|---|---|---|---|
| 2,338,897 | 1/1944 | Boulogne et al. | 267—11 |
| 2,887,324 | 5/1959 | Jackson | 267—11 |
| 3,013,811 | 12/1961 | Allinquant | 267—64 |

ARTHUR L. LA POINT, *Primary Examiner.*

U.S. Cl. X.R.

137—627.5